United States Patent
Uphoff

(10) Patent No.: US 7,160,461 B2
(45) Date of Patent: Jan. 9, 2007

(54) WATER PURIFICATION WITH CATALYTIC SURFACES AND MICROORGANISMS

(75) Inventor: Christian Uphoff, Aschau (DE)

(73) Assignee: Umwelttechnik Georg Fritzmeier GmbH & Co. KG, Grosshelfendorf (DE)

(*) Notice: Subject to any disclaimer, the term of this patent is extended or adjusted under 35 U.S.C. 154(b) by 0 days.

(21) Appl. No.: 10/531,037

(22) PCT Filed: Oct. 16, 2003

(86) PCT No.: PCT/DE03/03460

§ 371 (c)(1),
(2), (4) Date: May 10, 2005

(87) PCT Pub. No.: WO2004/035478

PCT Pub. Date: Apr. 29, 2004

(65) Prior Publication Data

US 2005/0242024 A1 Nov. 3, 2005

(30) Foreign Application Priority Data

Oct. 16, 2002 (DE) .................................. 102 48 315

(51) Int. Cl.
C02F 3/00 (2006.01)
(52) U.S. Cl. ..................................................... 210/631
(58) Field of Classification Search ................. 210/631
See application file for complete search history.

(56) References Cited

U.S. PATENT DOCUMENTS

| 5,194,161 | A | * | 3/1993 | Heller et al. ................. 210/748 |
| 6,686,309 | B1 | * | 2/2004 | Didillon et al. ............. 502/313 |
| 2002/0051998 | A1 | * | 5/2002 | Schmidt-Dannert et al. . 435/7.1 |

FOREIGN PATENT DOCUMENTS

| DE | 100 62 812 A1 | 6/2002 |
| DE | 101 50 014 A1 | 4/2003 |
| EP | 0 634 363 A1 | 1/1995 |
| EP | 0 900 766 A1 | 3/1999 |
| EP | 1 132 133 A1 | 9/2001 |

* cited by examiner

Primary Examiner—Chester T. Barry
(74) Attorney, Agent, or Firm—Oliff & Berridge, PLC

(57) ABSTRACT

A process for the purification of water is described, wherein a solution containing a proportion of a mixed microbiotic culture is added to the water in an environment having catalytic activity. This process may effectively be used for the purification of effluents and of waters in public and private installations.

15 Claims, 1 Drawing Sheet

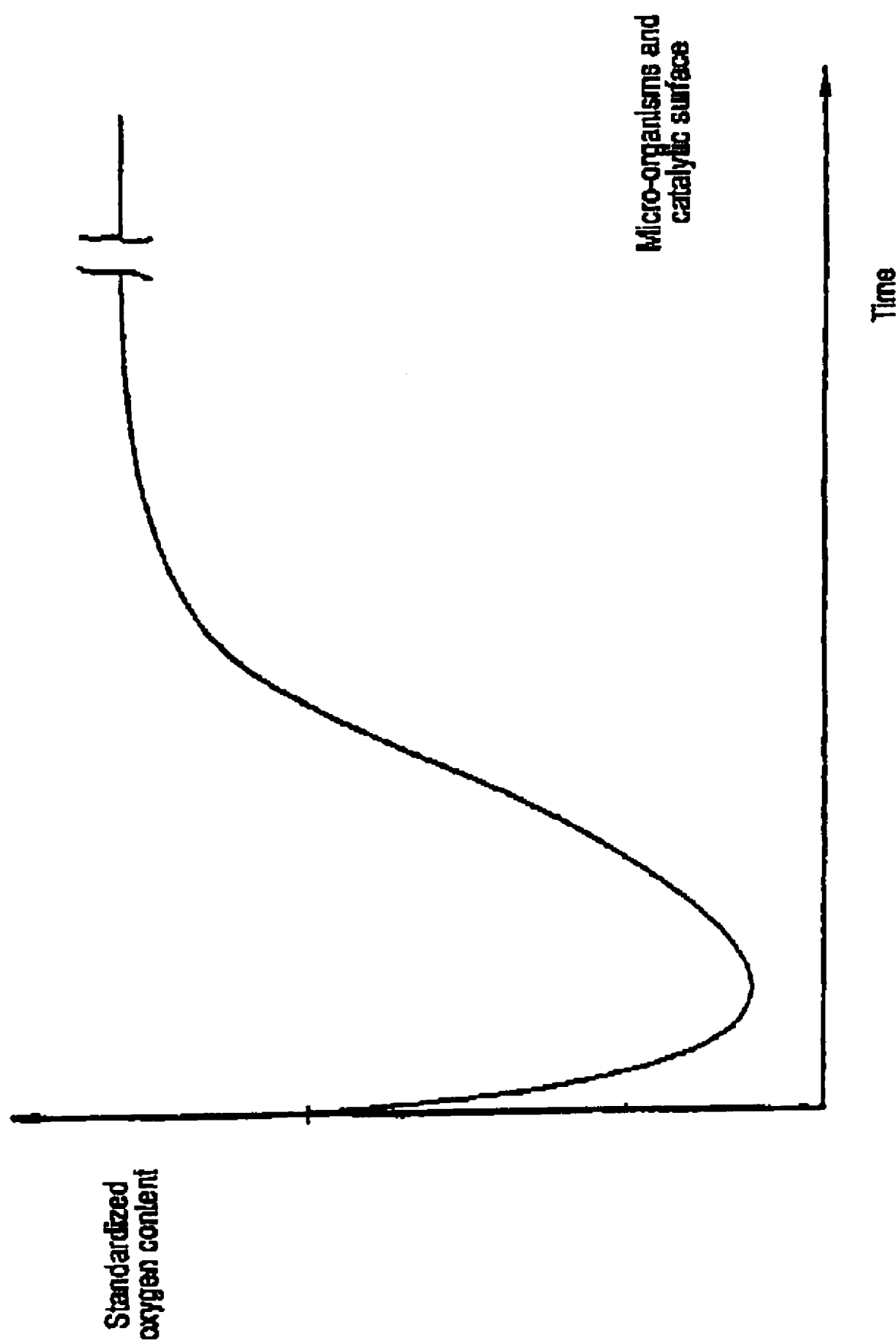

WATER PURIFICATION WITH CATALYTIC SURFACES AND MICROORGANISMS

The present invention relates to a process for the purification of water, and the application of this process.

The purification of water is of eminent importance. Thus, e.g., every day vast quantities of effluents getting into the communal sewer systems from industry and households have to be purified. These effluents are, as a general rule, highly contaminated with toxic substances and, e.g., surfactants.

Thus to a large degree so-called stagnant bodies of water also have to be purified. Besides the contaminations originating in the environment, these bodies of water are in particular also polluted by growth of algae.

Examples to be named here are backed-up waters in swimming pools and private households.

Hitherto the problem of water/waste water purification has been solved by using a variety of chemicals. It is, on the other hand, known that the conventionally utilized chemicals, such as chlorine and chlorine compounds, are hazardous for the health of humans, particularly when the purified water is reused.

As a result of this situation there arises the objective of developing a process entirely doing away with chemicals and with expensive apparative structures. It should moreover be adapted such that not only experts in the field of water purification can apply this process, but also persons desiring water purification in the domestic sector, whether in the house or in the garden.

This objective has been attained by the process of the invention in accordance with claim 1.

The invention concerns a process for the purification of water, wherein a a solution containing a proportion of a mixed microbiotic culture is added to the water in an environment having catalytic activity.

The subclaims concern preferred embodiments of the method in accordance with the invention.

The objective is moreover achieved through application of the method in accordance with the invention in accordance with claims 11 and 13.

Accordingly, the process of the invention is used for the purification of effluents and for the purification of waters in public and private installations.

The subclaims concern preferred embodiments of the application in accordance with the invention.

The invention and possible embodiments shall be described hereinbelow, with the advantageous effect of the method in accordance with the invention being explained by referring to a diagram.

It has surprisingly been found that water charged with contaminants may be purified effectively, in an environment-friendly manner, and without any hazard to humans, if a solution containing a proportion of a mixed microbiotic culture is added to this water in an environment having catalytic activity. It was unexpectedly found that when the solution with the mixed microbiotic culture is added to the contaminated water, even a few minutes later a distinct clarification of the contaminated water takes place at the boundary between the environment having catalytic activity and the contaminated water with concurrent formation of oxygen.

Thus it has also been demonstrated in examinations of the water charged with pollutants and treated with the process of the invention, that the oxygen content increases concurrently with a reduction of the nitrogen content in the water. This is an indication that the treated water is enriched with oxygen together with a considerable reduction of the amount of contaminants, and thus has been subjected to a purification process. Tests in the treatment of activated sludge showed that toxicity had dropped even after one day to then approach absolute zero.

In practice it has been found to design the catalytically active environment in such a way that it is brought about by catalytically active surfaces. In principle, any catalytically active surface may serve as a catalytically active environment, however under the condition that the water to be purified and the microorganisms enter into contact with it.

For example, a ceramic or polymer surface doped with catalyst substances may be used as a catalytically active surface. Examples for catalyst substances are organic and/or inorganic catalyst compounds.

In a particular embodiment of the method in accordance with the invention, a ceramic surface is used which contains titanium dioxide ($TiO_2$) or indium tin oxide. Conveniently such a ceramic surface may be a commercially available tile. Thus it has been found that the process of the invention may, e.g., advantageously may be utilized in the purification of swimming-pool water. It is also possible to clean facade tiles with the process of the invention. The use of such materials for waste water purification is known from DE 199 13 011 A1.

The process of the invention is moreover carried out by using a solution containing a proportion of a mixed microbiotic culture. In a particularly preferred practical example, the mixed culture contains photosynthetically active micro-organisms and luminous bacteria in a microbiological solution.

As regards the composition of the mixed microbiotic culture, reference is made to the older patent application DE 100 62 812 by the present applicant, the contents of which are herewith incorporated into the disclosure of the present patent application.

The photosynthetically active micro-organisms and the luminous bacteria should be considered as a system. The interaction between the photosynthetically active micro-organisms and the luminous bacteria has the result of the photosynthetically active micro-organisms being stimulated to photosynthesis by the light emitted by the luminous bacteria. The micro-organisms engage in photosynthesis with hydrogen sulphide and water and release sulphur or oxygen, respectively. Moreover they may fix nitrogen as well as phosphate and decompose organic as well as inorganic matter.

Preferably photosynthetically active micro-organisms which facultatively are phototropic are used in the method of the invention. Phototropic facultatively means that the micro-organisms can grow both under anaerobic conditions in light and under aerobic conditions in the dark.

Among the photosynthesis bacteria there are gram-negative aerobic rod-shaped and circular bacteria and gram-positive circular bacteria. These may include endospores or be present without spores. Among them there are for instance also gram-positive actinomycetes and related bacteria.

In this context it is also possible to name nitrogen-fixing organisms. Among these there are, e.g., algae, such as *Anabena Nostoc* in symbiosis with *Azola*. Moreover it is possible to name actinomycetes, e.g. *Frankia* in symbiosis with alder and bacteria, such as *Rhizobium* in symbiosis with leguminosae.

Moreover it is also possible to use aerobic algae, azotobacter, methane-oxidizing bacteria and sulphur bacteria. Among these there are also green sulphur bacteria and brown-green photosynthesis bacteria. Here one may also name non-purple sulphur bacteria and purple sulphur bacteria.

It is preferred if, in the microbiological composition used in accordance with the invention, prochlorophytes, cyanobacteria, green sulphur bacteria, purple bacteria, chloroflexus-type forms and heliobacterium and heliobacillus-type forms are contained as facultatively phototropic micro-organisms. The above named facultatively phototropic micro-organisms may also be present as mixtures of two or more of them. In a quite particular embodiment, all six of the above named micro-organisms are present as a mixture.

The light which powers photosynthesis originates from the luminous bacteria contained in the microbiological composition of the present invention as the second essential component. These luminous bacteria possess luminosity, i.e., they are capable of emitting photons. This is a system that operates enzymatically. As an example, one may here name the luciferin/luciferase system.

In one preferred embodiment, *Photobacterium phosphoreum, Vibrio fischeri, Vibrio harveyi, Pseudomonas lucifera* or *Beneckea* are contained in the mixture as luminous bacteria. It is also possible to select a mixture of at least two of these.

The mixed culture contains a proportion of micro-organisms, in particular bacteria serving the purpose of oxygen production through photosynthesis, through charge separation, and oxidation. Other micro-organisms, such as *Archaea,* for example, serve facile electron transfer of the reduction, and other micro-organisms, such as slime fungi, protect the mixed culture while moreover serving for the emission of phosphorescent light. It is being assumed that oxidation and reduction constantly alternate in the vicinity of the catalytic surface.

The mechanism of the water purification performed by the process of the invention is not fully understood yet. It is being assumed, however, that during the purification process the micro-organisms are passed by the environment having catalytic activity, e.g., the catalytically active surfaces, and are catalytically stimulated there. It has to be assumed that this is a photocatalytic process, wherein a photodynamic building of organic substances may come about owing to the combined action of the mixed culture and of the photocatalytically active lining.

A variant of the method in accordance with the invention consists in that upon irradiation of light, such as daylight, it is moreover possible to proceed without micro-organisms. It may be assumed that the catalytic environment, such as the catalytic surface, also effects the water purification through photocatalytic intervention. The applicant reserves the option of directing a divisional application at this at a later point of time.

In order to optimize the microbiological composition used in the process of the invention, additional constituents may be contained in it. Preferably such secondary constituents are plant extracts, enzymes, trace elements, polysaccharides, alginic derivatives, other microorganisms as above. The secondary constituents may be present in the microbiological composition either singly or in combination. The plant extracts may contain, e.g., ribwort, hops, etc.

As a nutrient solution for the microbiological composition, generally a solution is used which contributes to making life readily possible for the constituents contained therein, in particular for the microorganisms. Here it is particularly crucial to allow full interaction of the photosynthesis bacteria and of the luminous bacteria to unfold. It was found that a biological nutrient solution including molasses, in particular raw sugar molasses or sugar beet molasses, is suited as a main ingredient.

The photosynthetically active microorganisms and the luminous bacteria normally are present in the microbiological composition of the invention in a ratio of 1:10 to 1:500. A preferred ratio is 1:100.

The quantity of the solution of mixed culture employed in the process of the invention is not subject to particular restrictions. It depends i.a. on the degree and type of pollution of the water to be treated.

The above described components are homogenized, so that the first intermediate product of the method in accordance with the invention that is present is a microbiotic culture, the quantity of which is adjusted as a function of the water to be treated optionally the mixed culture is frozen for later use, or lyophilized under vacuum with concurrent dehydration.

Dehydration is a widely used process for gentle drying and preservation of sensitive goods. The drying parameters are adjusted so as to preclude damage to the microorganisms. It was found in preliminary trials that a cooling rate of more than 30° C. per minute, preferably about 40° C. per minute or more rapid, is optimal in order to prevent damage to the microorganisms.

By this drying step the extra-cellular polymer substances (EPS) surrounding the cells of the microorganisms are dehydrated, so that the slimy EPS layer is thickened and forms a protective layer that protects the microorganisms during the freezing step.

It was found to be very favorable in practice if the water to be purified is stirred, in order to thereby ensure that the water to be purified and the microorganisms in their entirety enter into contact with the environment having catalytic activity. Here it is left up to the user's discretion to stir continuously or intermittently. Stirring may be performed with customary stirring means, for example with a rod or a motor-driven stirrer.

The process of the invention may successfully be employed in the field of the purification of effluents. Thus, e.g., pump sumps and waters in purification plants may be purified.

Thus the process of the invention may safely also be used for producing drinking water from highly polluted or contaminated waters. The microorganisms should in this case, however, be separated off conventionally through membranes.

The advantageous effect of the method in accordance with the invention shall be explained by referring to the single appended figure. It shows the oxygen concentration in a container filled with contaminated waste water that has been treated for several days in accordance with the process of the invention.

In accordance with the invention, the container is lined with a photocatalytically active layer consisting, e.g., of a ceramic containing titanium dioxide. This ceramic is applied in the form tiles—similar to those in a bath—and is correspondingly simple to process. Organically contaminated waste water was filled into this lined container, and at the outset of the experiment, a microbiotic solution according to the invention was added to it. In accordance with the above explanations this mixed culture contains a proportion of light-emitting microorganisms and a proportion of photosynthetically active microorganisms. The diagram shows that the oxygen content drops very rapidly—within the first two days—to then rise to a level that is higher in comparison with at the outset of the experiment. The initial strong drop in oxygen concentration is due to the fact that the toxic constituents must initially be decomposed by the microorganisms. After these toxic constituents have been decomposed to a large degree, the oxygen content rises owing to the decomposition of the organic constituents and the accompanying production of oxygen, to then reach a largely constant level. Visual inspection of the waste water shows it to have become considerably clearer in comparison with the initial turbid condition owing to the decomposition of the organic constituents.

Oxidation of the organic constituents is supported by the photocatalytic effect of lining the container, whereby in the boundary region an additional oxidation of the organic compounds into $H_2O$, $CO_2$, HCl, $N_2$ takes place. The photocatalytic effect of the lining is, of course, particularly good if the waste water being treated is subjected to irradiation of light.

When the microorganisms are left out, decomposition of the toxic constituents takes place substantially more slowly, i.e., the drop of the oxygen concentration in the waste water is considerably less steep than in the represented diagram.

The advantageous effect of the method in accordance with the invention may generally also be proven if the container is shielded against daylight or another light source—apparently the effect of the light-emitting bacteria is sufficient to enable decomposition of the organic constituents with the aid of the microorganisms and the photocatalytic effect of the lining.

It was found that the redox potential of more than 700 mV in contaminated waters may be raised to a range of 350–400 mV by the process of the invention. Following separation of the microorganisms with the aid of a membrane, the remaining redox potential might then be set to >+800 mV through the addition of ozone and chlorine in minimal quantities.

As was already set forth above, the process of the invention is advantageously also suited for the purification of waters in public and private installations. Among these there are, for example, swimming pools, wells, etc. The waters contaminated by algae may readily be purified rapidly and effectively by the process of the invention. Thus it is also possible to purify waters contaminated with contaminants, which do not get into purification plants. Among them there are, for instance, effluents from agriculture such as horse channels, etc.

As was described above, water may effectively be purified through the process of the invention without a particular apparative structure being required. The process is environment-friendly and not hazardous for the persons working with it.

The invention claimed is:

1. Process for the purification of water, wherein a solution containing a proportion of a mixed microbiotic culture is added to the water in an environment having catalytic activity, characterized in that, said mixed culture contains a system of photosynthetically active microorganisms and luminous bacteria in a biological solution, wherein the photosynthetically active microorganisms and the luminous bacteria are considered as a system, in which photosynthetically active microorganisms are stimulated to photosynthesis by the light emitted by the luminous bacteria.

2. Process in accordance with claim 1, characterized in that the catalytically active environment is brought about by catalytically active surfaces.

3. Process in accordance with claim 2, characterized in that a ceramic or polymer surface doped with catalyst substances is used as said catalytically active surface.

4. Process in accordance with claim 3, characterized in that organic and/or inorganic catalyst compounds are used as catalyst substances.

5. Process in accordance with claim 3, characterized in that titanium dioxide (TiO2) is contained in said ceramic surface.

6. Process in accordance with claim 5, characterized in that said ceramic surface used is a tile.

7. Process in accordance with claim 1, characterized in that said mixed culture contains photosynthetically active microorganisms and luminous bacteria in a biological solution.

8. Process in accordance with claim 7, characterized in that prochlorophytes, cyanobacteria, green sulphur bacteria, purple bacteria, chloroflexus-type forms and heliobacterium and heliobacillus-type forms as well as mixtures of two or more of these are contained in said mixture as facultatively phototropic microorganisms.

9. Process in accordance with claim 7, characterized in that Photobacterium phosphoreum, Vibrio fischeri, Vibrio harveyi, Pseudomonas lucifera or Beneckea or mixtures of at least two of these are contained in said mixture as luminous bacteria.

10. Process in accordance with claim 1, characterized in that said solution contains as secondary constituents plant extracts, enzymes, trace elements, polysaccharides, alginic derivatives, other microorganisms, either singly or in combination.

11. Process in accordance with claim 1, characterized in that the water to be purified is stirred continuously or intermittently.

12. Application of the process in accordance with claim 1 for the purification of effluents.

13. Application in accordance with claim 12, characterized in that pump sumps and waters in purification plants are purified.

14. Application of the process in accordance with claim 1 for the purification of waters in public and private installations.

15. Application in accordance with claim 14 for removing algae.

* * * * *